United States Patent
Chauhan et al.

(10) Patent No.: US 10,942,714 B2
(45) Date of Patent: *Mar. 9, 2021

(54) RESPONSIVE SELF-SERVICE TEMPLATE

(71) Applicant: salesforce.com, inc., San Francisco, CA (US)

(72) Inventors: Chetanya Chauhan, San Francisco, CA (US); Michael Chou, Los Altos, CA (US); Joseph Shelby Hubick, Vancouver (CA)

(73) Assignee: salesforce.com, inc., San Francisco, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/673,254

(22) Filed: Nov. 4, 2019

(65) Prior Publication Data

US 2020/0278844 A1 Sep. 3, 2020

Related U.S. Application Data

(63) Continuation of application No. 15/996,194, filed on Jun. 1, 2018, now Pat. No. 10,466,983, which is a
(Continued)

(51) Int. Cl.
*G06F 9/44* (2018.01)
*G06F 8/38* (2018.01)
(Continued)

(52) U.S. Cl.
CPC .............. *G06F 8/38* (2013.01); *G06F 16/951* (2019.01); *G06F 16/958* (2019.01);
(Continued)

(58) Field of Classification Search
CPC ........ G06F 8/38; G06F 16/958; G06F 16/972; G06F 16/951; G06F 40/109; H04L 67/02; H04L 67/10
(Continued)

(56) References Cited

U.S. PATENT DOCUMENTS 5,577,188 A 11/1996 Zhu
5,608,872 A 3/1997 Schwartz et al.
(Continued)

OTHER PUBLICATIONS

Title: GIST: a model for design and management of content and interactivity of customer-centric web sites author: Terri C. Albert Published on 2004.*
(Continued)

*Primary Examiner* — Chameli Das
(74) *Attorney, Agent, or Firm* — Sterne, Kessler, Goldstein & Fox P.L.L.C.

(57) ABSTRACT

The technology disclosed relates to a self-service customization protocol for a single page website that implements a support component add-in to a CRM website. The protocol may be configured to customize support component add-in code for the CRM website, in some embodiments, at least by customization instructions applicable to the at least one page element of the support component add-in to the CRM website. In some embodiments, the at least one page element may be configured to search at least one support article hosted by the CRM website, display a visual representation of at least one featured category of articles available within the CRM website, and contact support for the CRM website, for example.

20 Claims, 13 Drawing Sheets

Simplified Development of a CRM-Integrated Website Support Component

Related U.S. Application Data continuation of application No. 15/333,088, filed on Oct. 24, 2016, now Pat. No. 9,990,185, which is a continuation of application No. 14/957,427, filed on Dec. 2, 2015, now Pat. No. 9,477,449, which is a continuation of application No. 14/459,246, filed on Aug. 13, 2014, now Pat. No. 9,244,660.

(60) Provisional application No. 61/865,284, filed on Aug. 13, 2013.

(51) Int. Cl.
  *G06F 16/951* (2019.01)
  *G06F 16/958* (2019.01)
  *G06F 40/109* (2020.01)
  *H04L 29/08* (2006.01)

(52) U.S. Cl.
  CPC .......... *G06F 16/972* (2019.01); *G06F 40/109* (2020.01); *H04L 67/02* (2013.01); *H04L 67/10* (2013.01)

(58) Field of Classification Search
  USPC ........................................................ 717/109
  See application file for complete search history.

(56) References Cited

U.S. PATENT DOCUMENTS

| | | |
|---|---|---|
| 5,649,104 A | 7/1997 | Charleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec |
| 6,324,693 B1 | 11/2001 | Brodersen et al. |
| 6,336,137 B1 | 1/2002 | Lee et al. |
| D454,139 S | 3/2002 | Feldcamp |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,473,794 B1 | 10/2002 | Guheen |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,606,744 B1 | 8/2003 | Mikurak |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker et al. |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,069,231 B1 | 6/2006 | Cinarkaya et al. |
| 7,069,497 B1 | 6/2006 | Desai |
| 7,181,758 B1 | 2/2007 | Chan |
| 7,289,976 B2 | 10/2007 | Kihneman et al. |
| 7,340,411 B2 | 3/2008 | Cook |
| 7,356,482 B2 | 4/2008 | Frankland et al. |
| 7,401,094 B1 | 7/2008 | Kesler |
| 7,412,455 B2 | 8/2008 | Dillon |
| 7,508,789 B2 | 3/2009 | Chan |
| 7,603,483 B2 | 10/2009 | Psounis et al. |
| 7,620,655 B2 | 11/2009 | Larsson et al. |
| 7,698,160 B2 | 4/2010 | Beaven et al. |
| 7,779,475 B2 | 8/2010 | Jakobson et al. |
| 7,851,004 B2 | 12/2010 | Hirao et al. |
| 8,014,943 B2 | 9/2011 | Jakobson |
| 8,015,495 B2 | 9/2011 | Achacoso et al. |
| 8,032,297 B2 | 10/2011 | Jakobson |
| 8,073,850 B1 | 12/2011 | Hubbard et al. |
| 8,082,301 B2 | 12/2011 | Ahlgren et al. |
| 8,095,413 B1 | 1/2012 | Beaven |
| 8,095,594 B2 | 1/2012 | Beaven et al. |
| 8,161,149 B2 | 4/2012 | Lippincott et al. |
| 8,209,308 B2 | 6/2012 | Reuben et al. |
| 8,209,333 B2 | 6/2012 | Hubbard et al. |
| 8,275,836 B2 | 9/2012 | Beaven et al. |
| 8,457,545 B2 | 6/2013 | Chan |
| 8,468,117 B1 | 6/2013 | Chasman et al. |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Reuben et al. |
| 8,510,664 B2 | 8/2013 | Reuben et al. |
| 8,566,301 B2 | 10/2013 | Reuben et al. |
| 8,646,103 B2 | 2/2014 | Jakobson et al. |
| 8,756,275 B2 | 6/2014 | Jakobson |
| 8,769,004 B2 | 7/2014 | Jakobson |
| 8,769,017 B2 | 7/2014 | Jakobson |
| 8,849,693 B1 | 9/2014 | Koyfman et al. |
| 9,009,585 B1 | 4/2015 | Chetrit et al. |
| 9,244,660 B2 | 1/2016 | Chauhan et al. |
| 9,477,449 B2 | 10/2016 | Chauhan et al. |
| 9,990,185 B2 | 6/2018 | Chauhan et al. |
| 10,466,983 B2 | 11/2019 | Chauhan et al. |
| 10,534,851 B1 * | 1/2020 | Chan ................. G06Q 30/0255 |
| 2001/0044791 A1 | 11/2001 | Richter et al. |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robins |
| 2003/0004971 A1 | 1/2003 | Gong et al. |
| 2003/0018705 A1 | 1/2003 | Chen et al. |
| 2003/0018830 A1 | 1/2003 | Chen et al. |
| 2003/0066031 A1 | 4/2003 | Laane |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |

(56) References Cited

U.S. PATENT DOCUMENTS

| | | |
|---|---|---|
| 2003/0070005 A1 | 4/2003 | Mukundan et al. |
| 2003/0074418 A1 | 4/2003 | Coker |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio |
| 2004/0015981 A1 | 1/2004 | Coker et al. |
| 2004/0027388 A1 | 2/2004 | Berg et al. |
| 2004/0064503 A1* | 4/2004 | Karakashian ........... G06F 9/541 709/203 |
| 2004/0107125 A1 | 6/2004 | Guheen |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2005/0188349 A1 | 8/2005 | Bent et al. |
| 2006/0021019 A1 | 1/2006 | Hinton et al. |
| 2006/0178918 A1 | 8/2006 | Mikurak |
| 2007/0067711 A1 | 3/2007 | Woodall et al. |
| 2007/0094608 A1 | 4/2007 | Getsch |
| 2007/0124671 A1 | 5/2007 | Hackworth et al. |
| 2007/0226241 A1* | 9/2007 | Ng ..................... G06F 16/252 |
| 2007/0244990 A1 | 10/2007 | Wells |
| 2008/0249972 A1 | 10/2008 | Dillon |
| 2009/0063415 A1 | 3/2009 | Chatfield et al. |
| 2009/0100342 A1 | 4/2009 | Jakobson |
| 2009/0177744 A1 | 7/2009 | Marlow et al. |
| 2010/0039664 A1* | 2/2010 | Funakawa ............ G03G 15/502 358/1.15 |
| 2010/0251143 A1* | 9/2010 | Thomas ................ G06F 16/958 715/760 |
| 2011/0214067 A1 | 9/2011 | Tanaka |
| 2011/0218958 A1 | 9/2011 | Warshavsky et al. |
| 2011/0219397 A1 | 9/2011 | Drope |
| 2011/0247051 A1 | 10/2011 | Bulumulla et al. |
| 2012/0042218 A1 | 2/2012 | Cinarkaya et al. |
| 2012/0066378 A1 | 3/2012 | Lui |
| 2012/0084638 A1 | 4/2012 | Calvin et al. |
| 2012/0143817 A1 | 6/2012 | Prakbaker |
| 2012/0233137 A1 | 9/2012 | Jakobson et al. |
| 2012/0290407 A1 | 11/2012 | Hubbard et al. |
| 2012/0303724 A1 | 11/2012 | Li et al. |
| 2013/0091204 A1 | 4/2013 | Loh et al. |
| 2013/0212497 A1 | 8/2013 | Zelenko et al. |
| 2013/0247216 A1 | 9/2013 | Cinarkaya et al. |
| 2013/0325726 A1 | 12/2013 | Tuchman et al. |
| 2014/0032484 A1 | 1/2014 | Cameron et al. |
| 2014/0053060 A1* | 2/2014 | Walker ................. G06F 16/958 715/234 |
| 2014/0075346 A1 | 3/2014 | Cardno et al. |
| 2014/0199663 A1 | 7/2014 | Sadeh-Koniecpol et al. |
| 2014/0279180 A1 | 9/2014 | Beaver et al. |
| 2014/0280771 A1 | 9/2014 | Bosworth et al. |
| 2015/0026224 A1* | 1/2015 | Yokoyama .............. G06F 16/48 707/812 |
| 2015/0052498 A1 | 2/2015 | Chauhan et al. |
| 2015/0227933 A1 | 8/2015 | Serebrnnikov |
| 2017/0038767 A1 | 2/2017 | Cluckers et al. |
| 2017/0046136 A1 | 2/2017 | Chauhan et al. |
| 2020/0319759 A1* | 10/2020 | Havoc Pennington ...................... G06F 3/04842 |

OTHER PUBLICATIONS

Title: Automation and customization of rendered web pages author: M Bolin, published on 2005 ; source: ACM.*

Title: Web customization using behavior-based remote executing agents; author: CL Sia,;published on 2004.*

"Aura Open Source Developer's Guide, version 31.0: Summer 2014," salesforce.com, last updated, Jun. 2, 2014, 220 pages.

"Community Template for Self-Service Implementation Guide (Beta)," salesforce.com: Summer '14, last updated: Jun. 23, 2014, 55 pages.

* cited by examiner

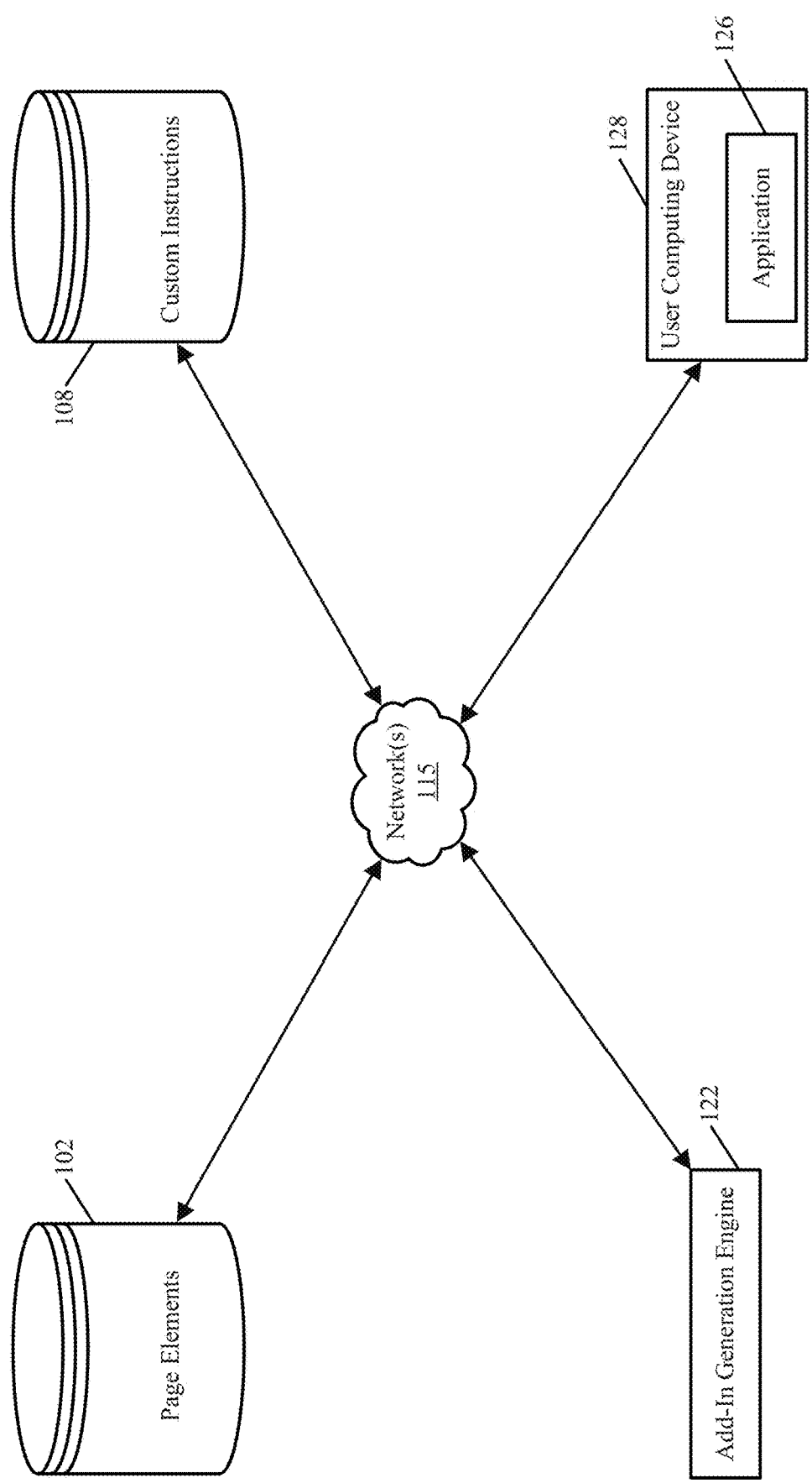

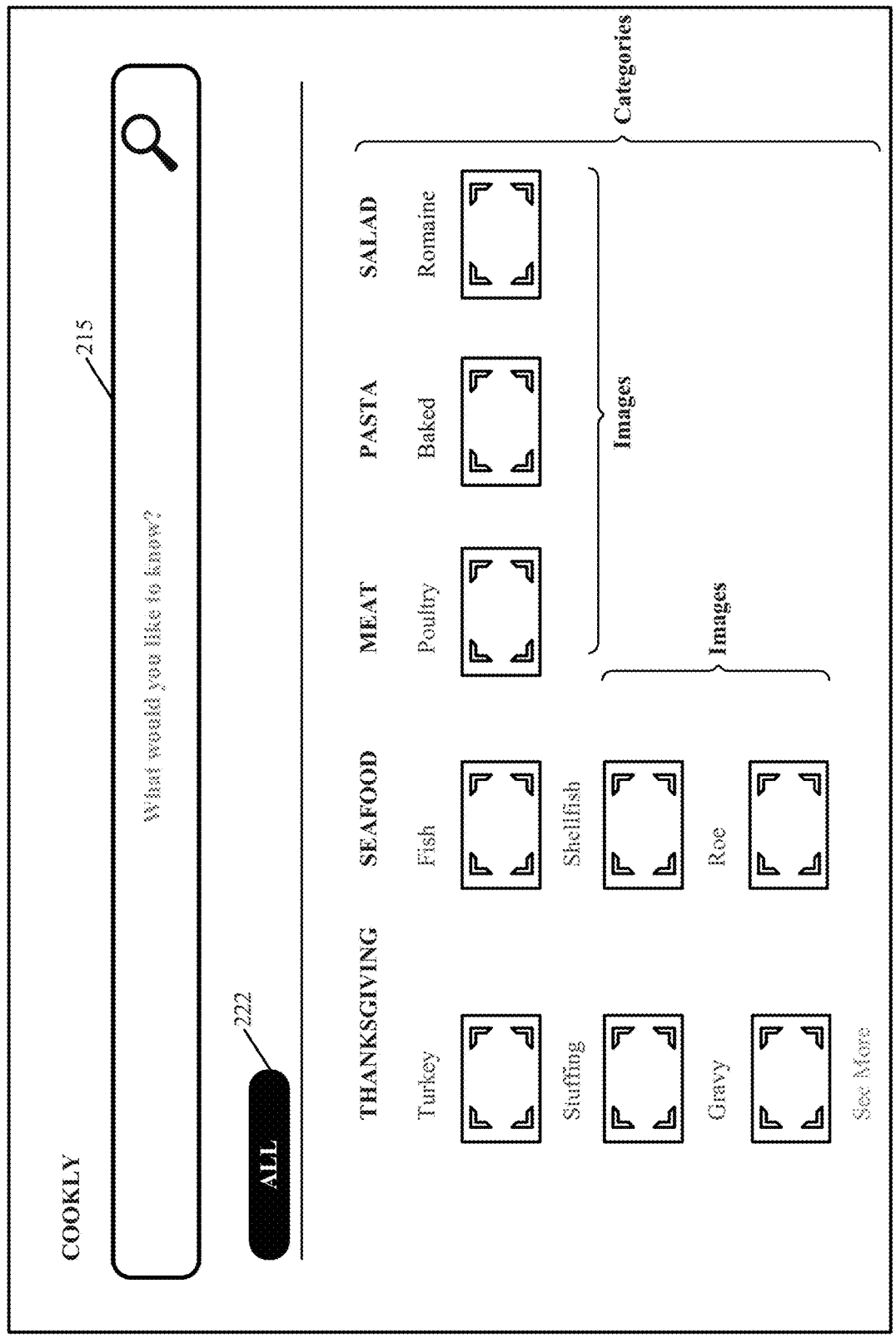
FIG. 2 – Visually Rich Customization Protocol

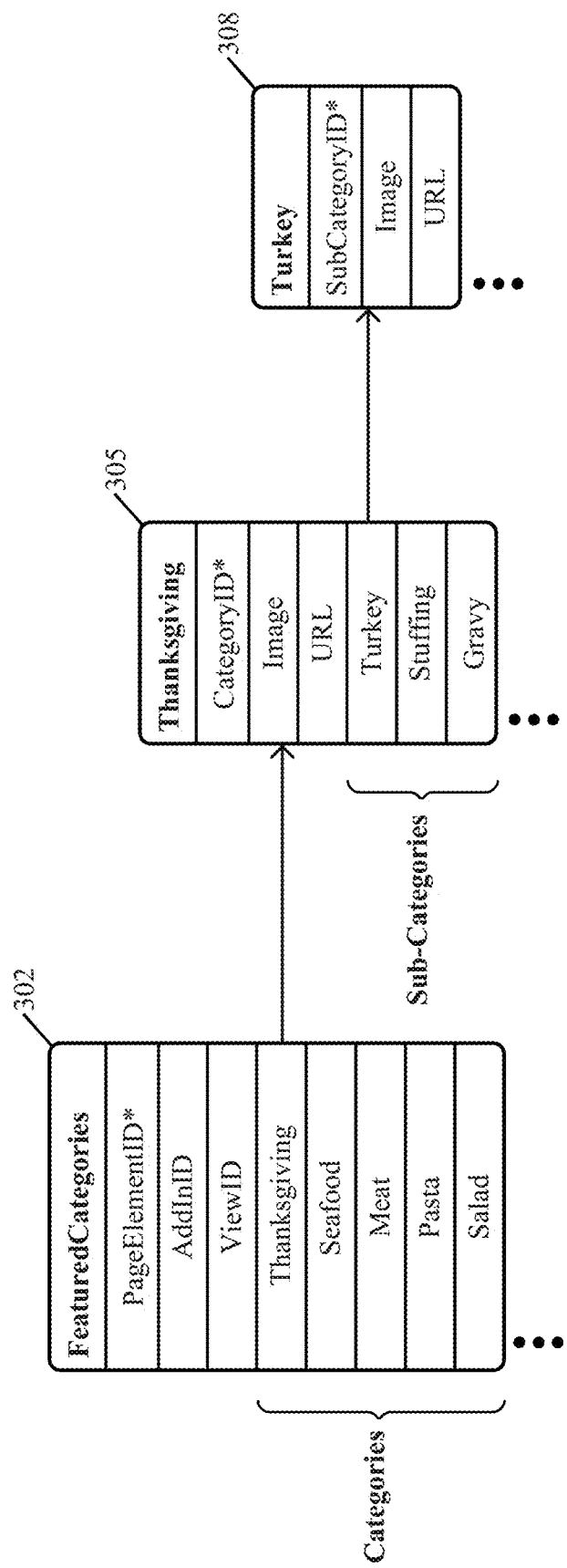
FIG. 3A – Featured Categories Schema

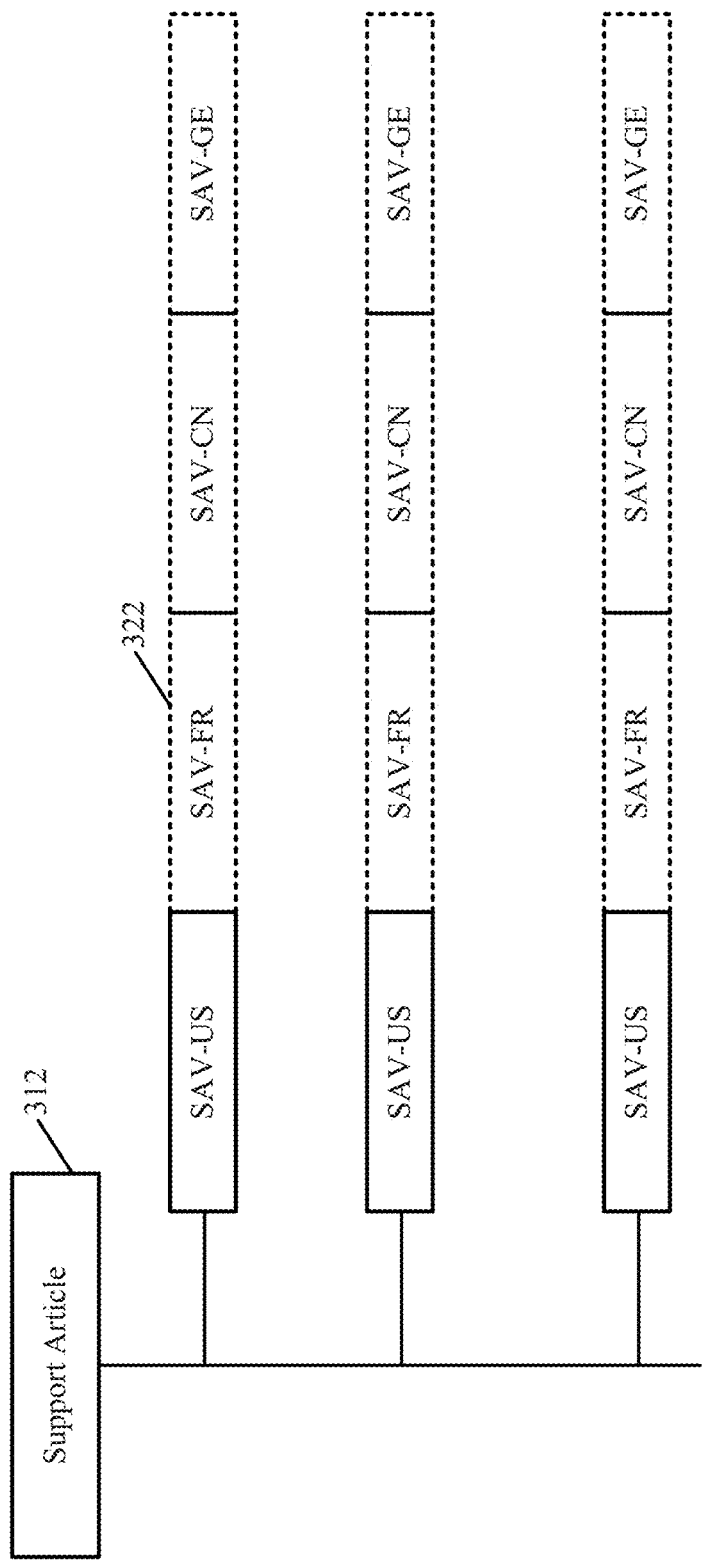
FIG. 3B – Support Article

COOKLY

_What would you like to know?_ — 215

ALL — 222

| | | | | |
|---|---|---|---|---|
| THANKSGIVING | SEAFOOD | MEAT | PASTA | SALAD |
| Turkey | Fish | Poultry | Baked | Romaine |
| Stuffing | Shellfish | | | |
| Gravy | Roe | | | |
| See More | | | | |
| CORN | DESERT | MUFFINS | BISCUITS | PANCAKES |
| White | Pannacotta | Blueberry | Baked | Banana |

Categories

TRENDING — 432

THANKSGIVING  SALAD

How to use butter in cooking?  Recipe for Pan-Fried Salmon Fillet?

How to cook a Turducken?  How to cook Marinated Wild Salmon?

How to roast the perfect turkey for Thanksgiving?

Articles

FIG. 4 – Text-Based Customization Profile

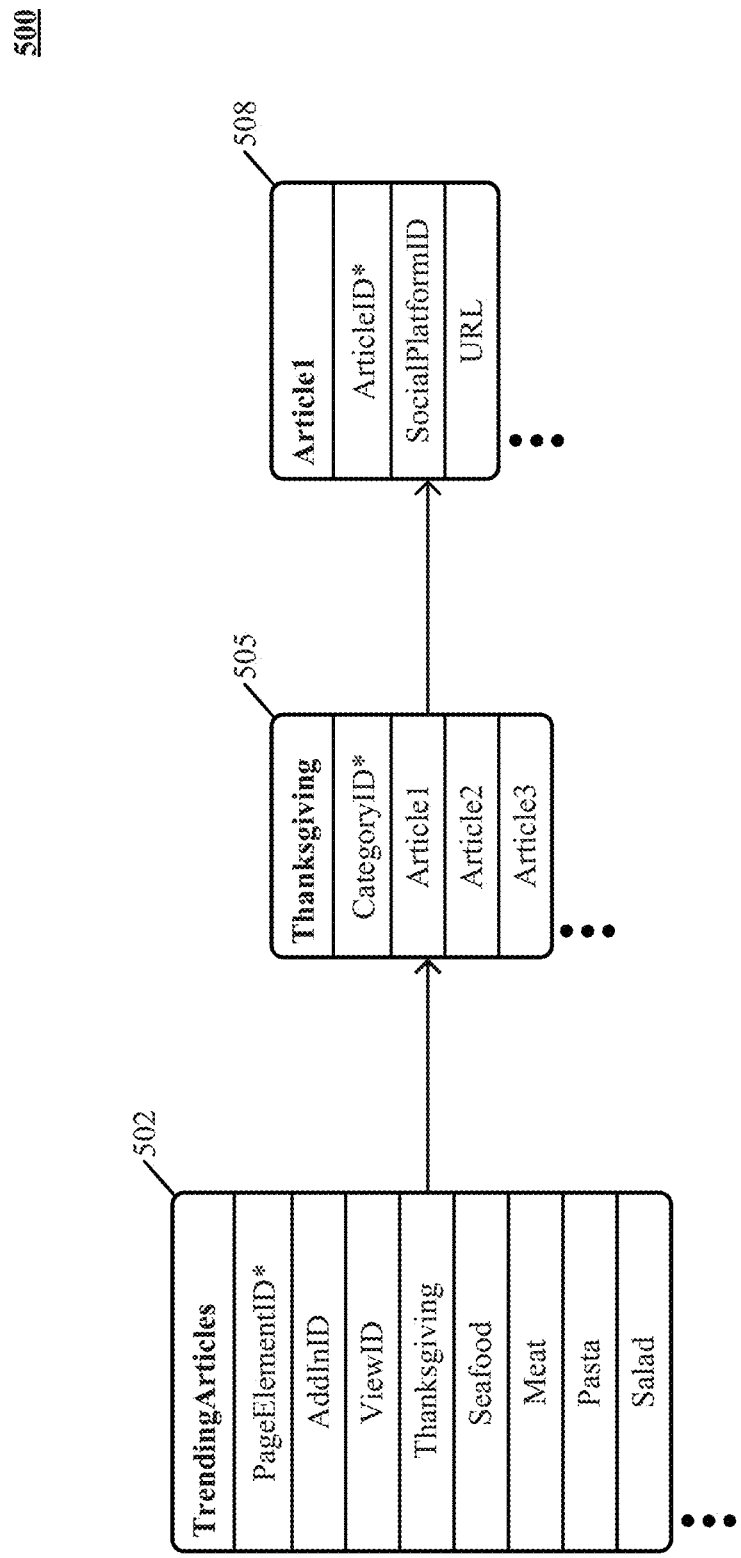
FIG. 5 – Trending Articles Schema

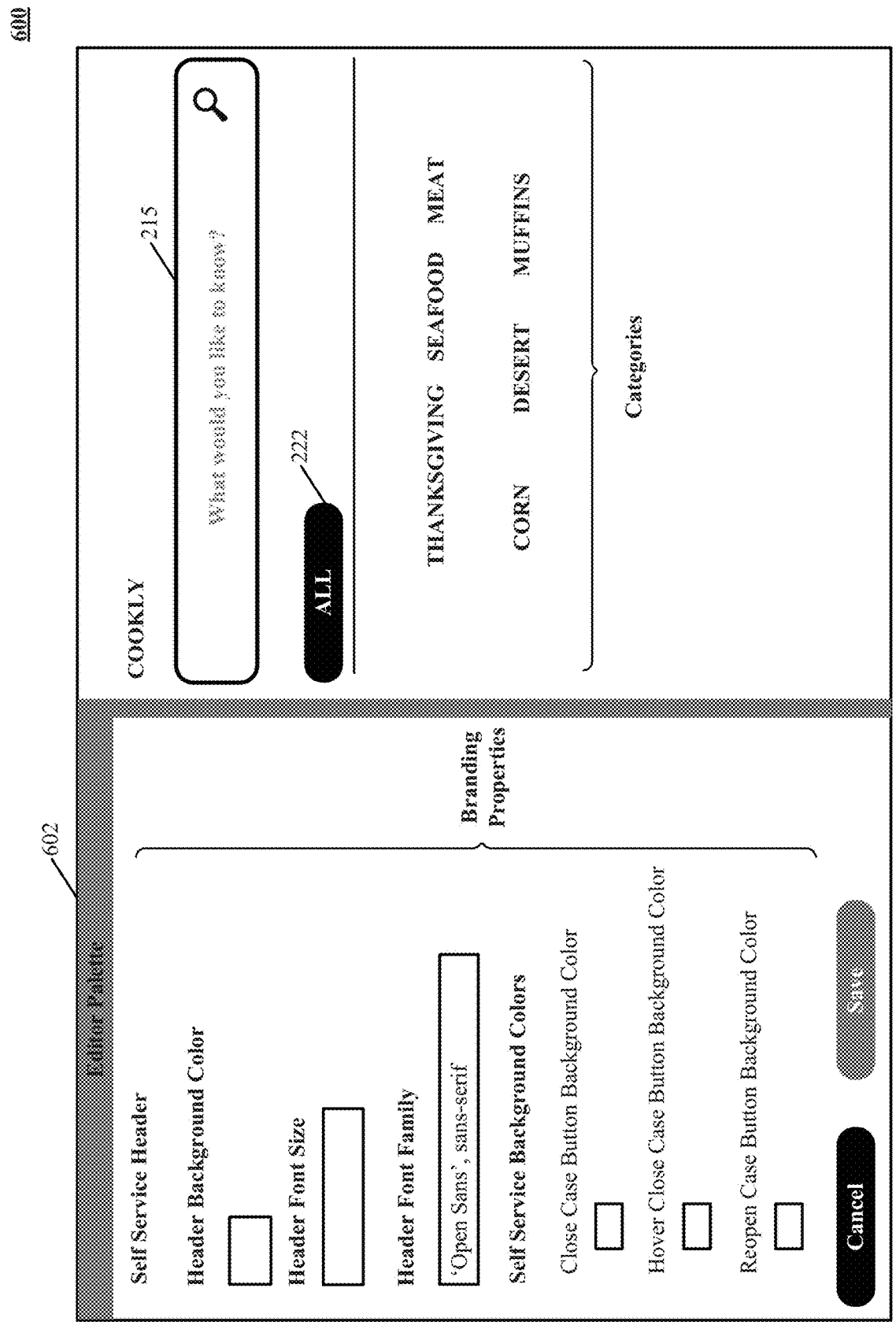
FIG. 6 – Branding Editor

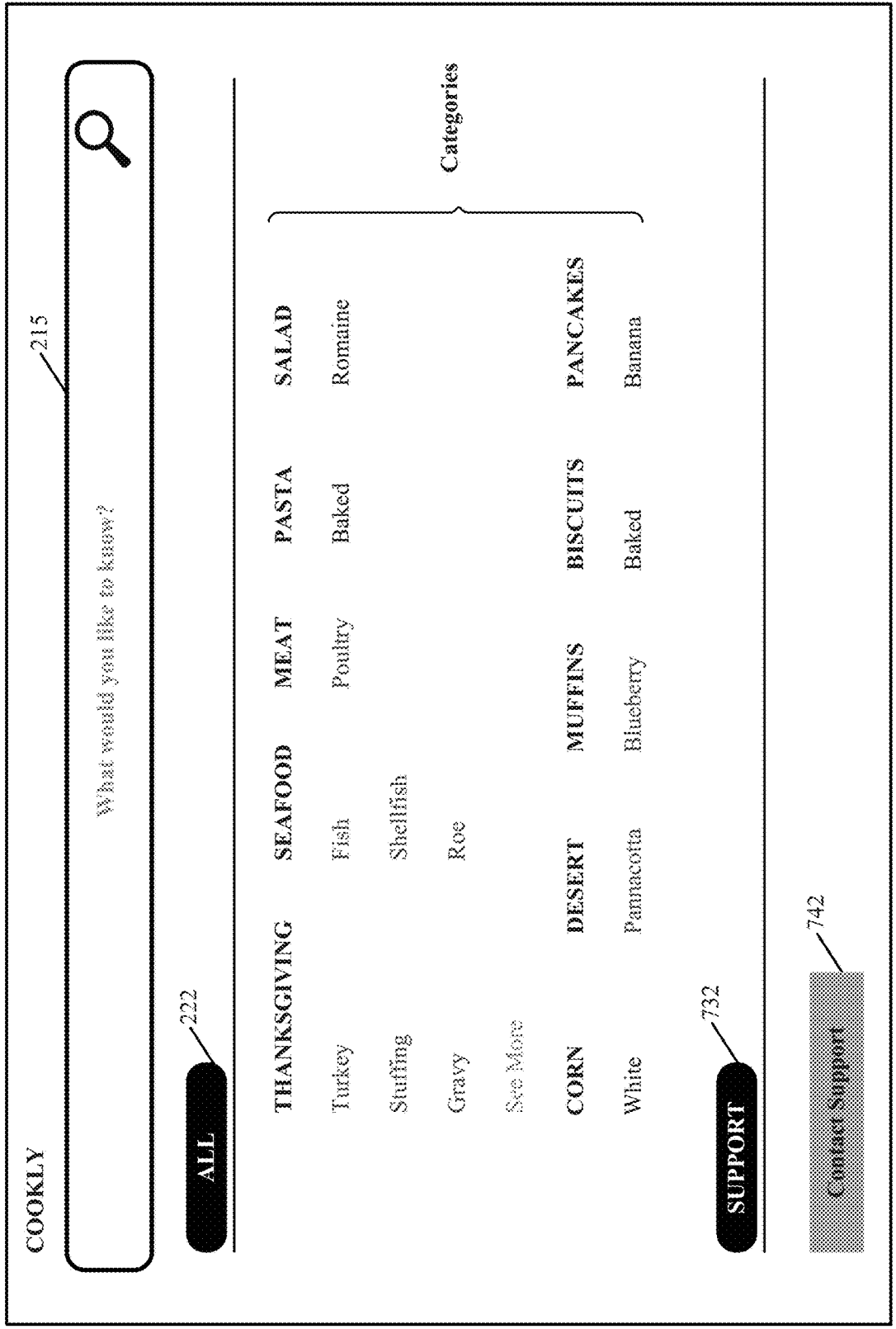
FIG. 7 – Case Submitter

FIG. 8 – Sub-Elements of Case Submitter

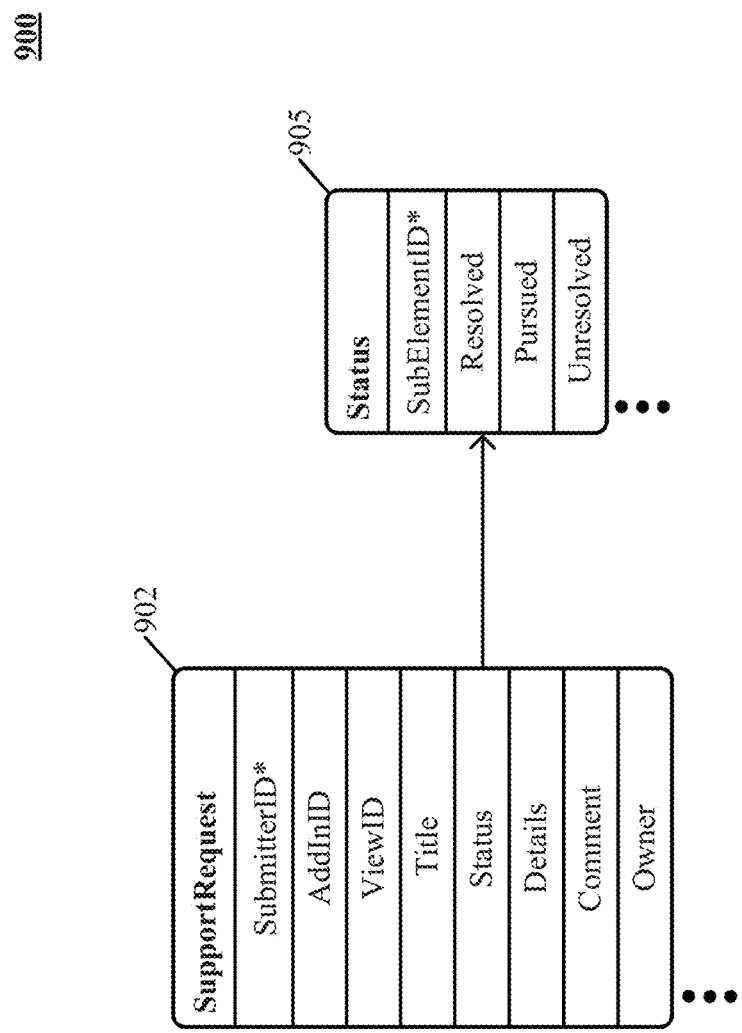
FIG. 9 – Case Submitter Schema

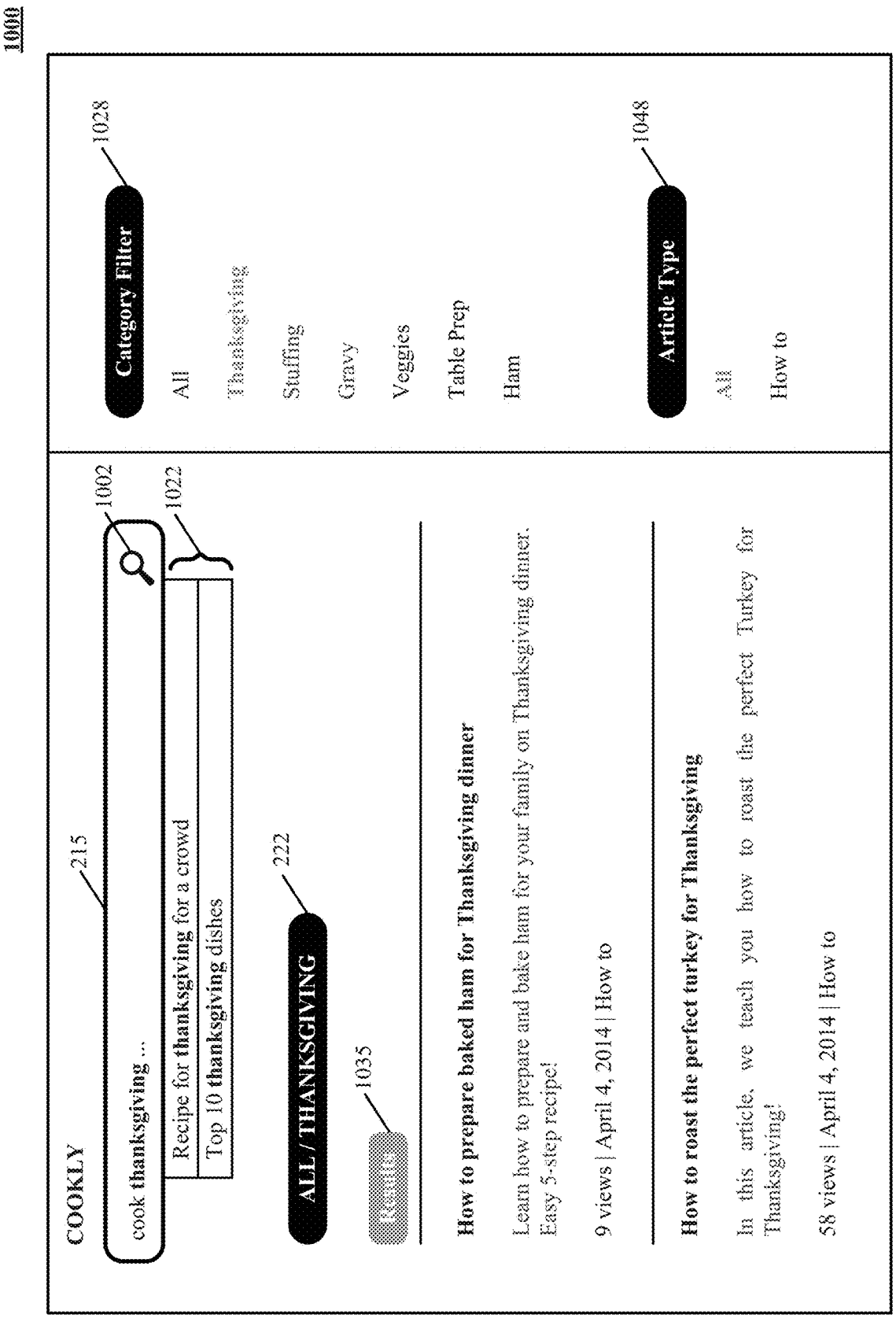
FIG. 10 – Search Box

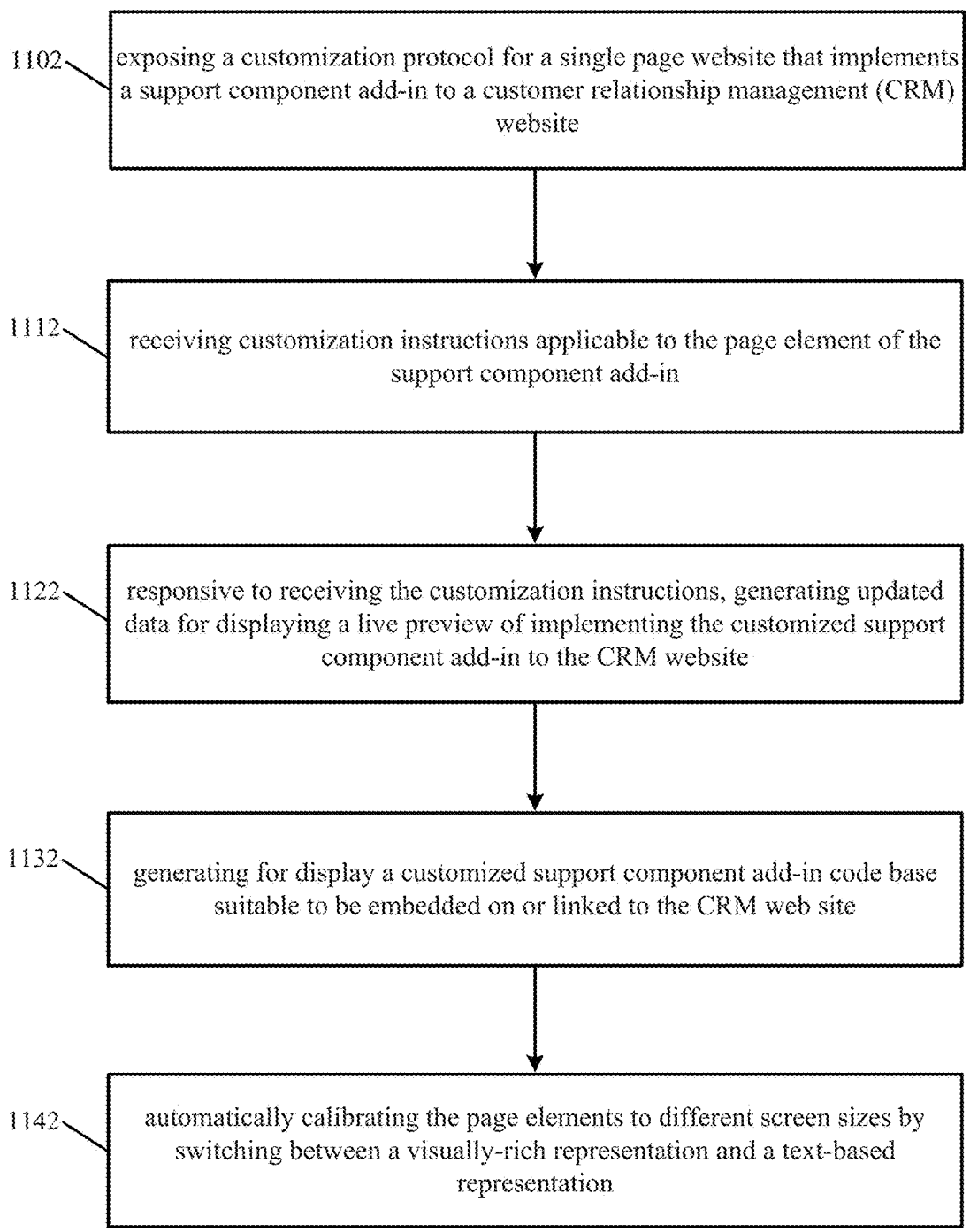
FIG. 11 – Simplified Development of a CRM-Integrated Website Support Component

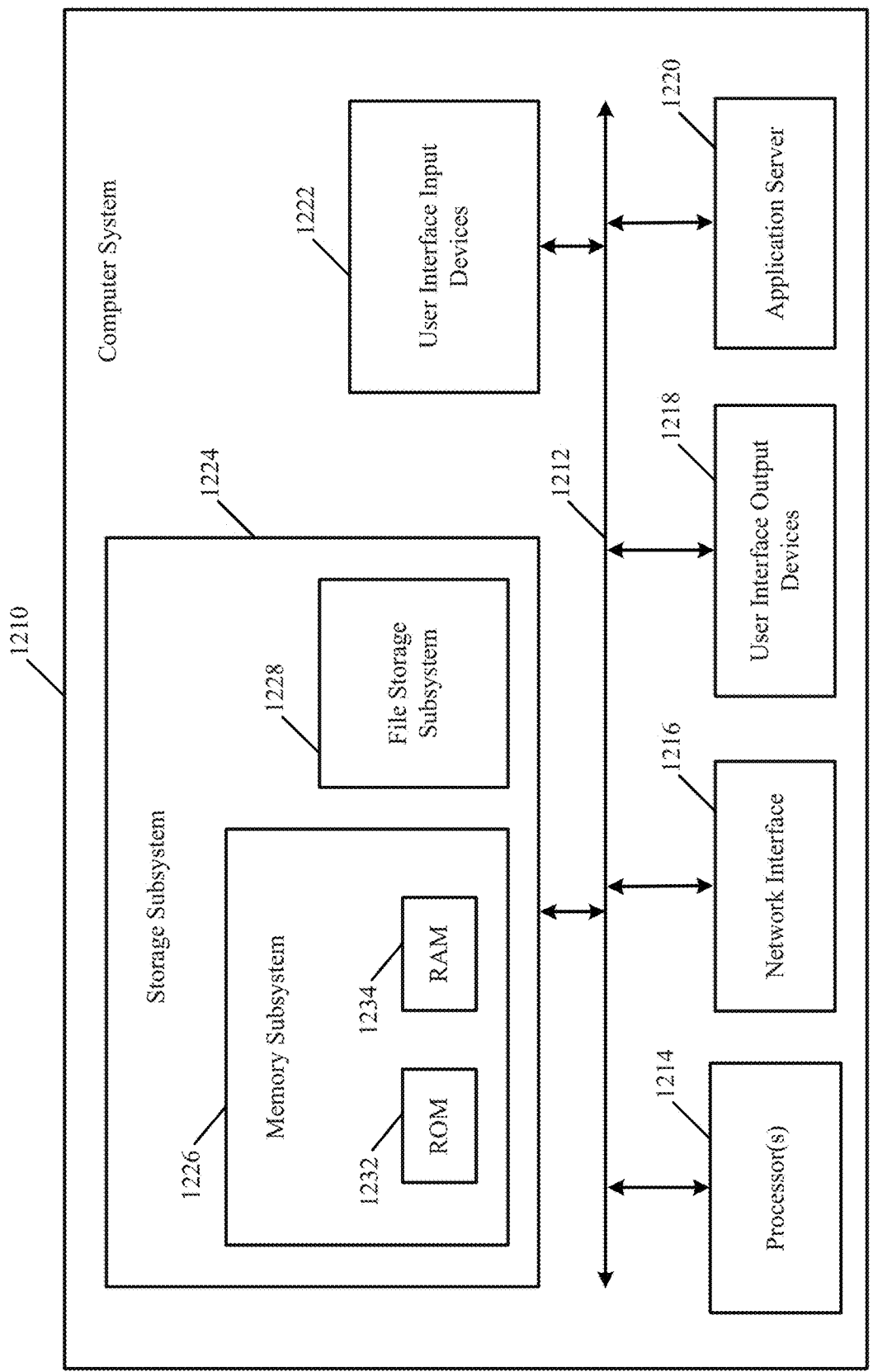
FIG. 12 – Computer System

RESPONSIVE SELF-SERVICE TEMPLATE

PRIORITY DATA

This application is a continuation of U.S. patent application Ser. No. 15/996,194, filed 1 Jun. 2018, now U.S. Pat. No. 10,466,983; which is a continuation of U.S. patent application Ser. No. 15/333,088, filed 24 Oct. 2016, now U.S. Pat. No. 9,990,185; which is a continuation of U.S. patent application Ser. No. 14/957,427, filed 2 Dec. 2015, now U.S. Pat. No. 9,477,449; which is a continuation of U.S. patent application Ser. No. 14/459,246, filed 13 Aug. 2014, now U.S. Pat. No. 9,244,660; which claims the benefit of U.S. Provisional Patent Application No. 61/865,284, filed 13 Aug. 2013, entitled "MOBILE SELF SERVICE PLATFORM," by Chetanya Chauhan, which are each hereby incorporated by reference in their entirety.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also correspond to implementations of the claimed technology.

Creating a website is often a difficult task for non-experts. Individuals who do not have experience with creating websites usually find it difficult to design and publish their own websites. Typically, most business owners do not possess the technical skills required to generate and maintain a website. A great deal of knowledge and effort is required to ensure that the website is professional looking and easy to navigate. Consequently, many individuals and small business turn to professional designers to build their customized websites. The costs associated professional website designers can be substantial.

Automated applications are available in the market that help a user create a website. Although such applications assist a user in developing a website, a considerable amount of judgment and know how, along with the writing of the content, is still required on the part of the user in order to develop a website with these applications.

Also, the mobile revolution has blessed the users with diverse computing devices of various sizes and other form-factors. As a result, multi-screen content delivery faces the challenges of bandwidth and operating system compatibility. Thus, users, especially, non-technical users, face the difficult task of developing websites that can be consistently displayed on different types of devices.

An opportunity arises to easily and efficiently build custom websites that fulfill the specific needs and requirement of the customers and that can be deployed globally across a wide spectrum of user computing devices. Improved customer experience and engagement, higher customer satisfaction and retention, and greater sales may result.

BRIEF DESCRIPTION OF THE DRAWINGS

In the drawings, like reference characters generally refer to like parts throughout the different views. Also, the drawings are not necessarily to scale, with an emphasis instead generally being placed upon illustrating the principles of the technology disclosed. In the following description, various implementations of the technology disclosed are described with reference to the following drawings, in which:

FIG. 1 shows an example environment of constructing a responsive self-service CRM website using a support component add-in.

FIG. 2 shows a visually rich customization protocol of the support add-in component that presents visitors of the CRM website with support articles organized by data categories.

FIG. 3A shows one implementation of a schema of featured categories page element.

FIG. 3B illustrates one implementation of a collection of support articles.

FIG. 4 depicts one implementation of a text-based customization protocol suitable for mobile devices with small screen sizes.

FIG. 5 shows one implementation of a schema of tending articles page element.

FIG. 6 depicts one implementation of a branding editor that customizes page elements of a support component add-in in response to customer instructions.

FIGS. 7 and 8 show one implementation of a case submitter page element.

FIG. 9 shows one implementation of a schema of a case submitter page element.

FIG. 10 illustrates one implementation of a search view of the support add-in component.

FIG. 11 is a representative method of simplified development of a CRM-integrated website support component add-in.

FIG. 12 is a block diagram of an example computer system used for simplified development of a CRM-integrated website support component add-in.

DETAILED DESCRIPTION

Introduction

The technology disclosed allows website developers to quickly and easily build a self-service customer relationship management (CRM) portion of a website, which gives customers visual and functional experience that is specific, customized, and/or responsive to their respective user computing devices, whether they be tablets, mobile devices, or desktops. In one implementation, the visual representation and arrangement of the CRM portion of the website is adaptively displayed on various types of devices that differ with respect to screen sizes and available network bandwidth.

Customers want an easy way to interact with the service providers at their own convenience. Traditionally, a self-service support website gives customers easy access to support articles so that they can help themselves when they have questions. This self-service support website gives customers access to information and articles organized by product categories and contact support agents through official support channels and create and manage their cases. The technology disclosed presents a self-service website customization protocol that extends such a self-service support website to a variety of devices with a user experience that is oriented to the different computational and hardware specifications of a multitude of devices.

The technology disclosed provides a customization protocol for a single-page application that implements a support component add-in to the CRM website. The customization protocol includes a plurality of page elements that can be easily edited by the customers without any coding. A single-page application is a web application that loads a single HTML page. Unlike traditional website, which comprises of several pages that the customer navigates between, a single page application consists of several views that are used to update the page dynamically when the user interacts with it. This single page application has a responsive user interface that automatically scales to different screen sizes, such as mobile devices, tablets, or desktop browsers, by implementing views calibrated to the active screen.

According to one implementation, the technology disclosed includes a visually rich self-service customization protocol that presents visitors of the CRM website with support articles organized by data categories and allows visitors to submit support requests to get help from support agents. In another implementation, the technology disclosed includes a self-service customization protocol that is calibrated for mobile devices. It lets visitors search for and view articles by text categories, and contact support if they can't find what they're looking for.

In some implementations, the page elements in the self-service customization protocol allow customers to search a public knowledge base for answers to their questions without contacting a support agent, view articles based on data categories, select a specific category and search or browse within a smaller subset of articles, and log in and create a case when they can't find the answer they're looking for.

Examples of systems, apparatus, and methods according to the disclosed implementations are described in a "CRM" context. The example of a CRM website is being provided solely to add context and aid in the understanding of the disclosed implementations. In other instances, examples of support websites related to other industries like energy and utilities, education, agriculture and mining, medical services, etc. may be used. Other applications are possible, such that the following examples should not be taken as definitive or limiting either in scope, context, or setting. It will thus be apparent to one skilled in the art that implementations may be practiced in or outside the "CRM" context.

The described subject matter is implemented by a computer-implemented system, such as a software-based system, a database system, a multi-tenant environment, or the like. Moreover, the described subject matter can be implemented in connection with two or more separate and distance computer-implemented systems that cooperate and communicate with one another. One or more implementations can be implemented in numerous ways, including as a process, an apparatus, a system, a device, a method, a computer readable medium such as a computer readable storage medium containing computer readable instructions or computer program code, or as a computer program product comprising a computer usable medium having a computer readable program code embodied.

As used herein, "customer" refers to an individual or organization that intends to build a website to publicize its business and services. Further, as used herein, "visitor" refers to an end-user that visits a CRM website published by the customer on the Internet using the technology disclosed. In some implementations, a visitor can also be a consumer, account, lead, or prospect that uses or is interested in a product or service offered and publicized by the customer.

As used herein, the "specification" of an item of information does not necessarily require the direct specification of that item of information. Information can be "specified" in a field by simply referring to the actual information through one or more layers of indirection, or by identifying one or more items of different information which are together sufficient to determine the actual item of information. In addition, the term "identify" is used herein to mean the same as "specify."

As used herein, a given signal, event or value is "responsive to" a predecessor signal, event or value of the predecessor signal, event or value influenced by the given signal, event or value. If there is an intervening processing element, step or time period, the given signal, event or value can still be "responsive to" the predecessor signal, event or value. If the intervening processing element or step combines more than one signal, event or value, the signal output of the processing element or step is considered "responsive to" each of the signal, event or value inputs. If the given signal, event or value is the same as the predecessor signal, event or value, this is merely a degenerate case in which the given signal, event or value is still considered to be "responsive to" or "based on" the predecessor signal, event or value. "Dependency" of a given signal, event or value upon another signal, event or value is defined similarly.

Customization Environment

FIG. 1 shows an example environment 100 of constructing a responsive self-service CRM website using a support component add-in. FIG. 1 includes page elements database 102 and custom instruction database 108. FIG. 1 also shows network(s) 115, add-in generation engine 122, application 126, and user computing device 128. In other implementations, environment 100 may not have the same elements or components as those listed above and/or may have other/different elements or components instead of, or in addition to, those listed above, such as a web server and template database. The different elements or components can be combined into single software modules and multiple software modules can run on the same hardware.

Network(s) 115 is any network or combination of networks of devices that communicate with one another. For example, network(s) 115 can be any one or any combination of a LAN (local area network), WAN (wide area network), telephone network (Public Switched Telephone Network (PSTN), Session Initiation Protocol (SIP), 3G, 4G LTE), wireless network, point-to-point network, star network, token ring network, hub network, WiMAX, WiFi, peer-to-peer connections like Bluetooth, Near Field Communication (NFC), Z-Wave, ZigBee, or other appropriate configuration of data networks, including the Internet. In other implementations, other networks can be used such as an intranet, an extranet, a virtual private network (VPN), a non-TCP/IP based network, any LAN or WAN or the like.

Add-in generation engine 122 can be of varying types including a workstation, server, computing cluster, blade server, server farm, or any other data processing system or computing device. In some implementations, add-in generation engine 122 can be communicably coupled to user computing device 128 via different network connections, such as the Internet or a direct network link.

In some implementations, databases can store information from one or more tenants into tables of a common database image to form an on-demand database service (ODDS), which can be implemented in many ways, such as a multi-tenant database system (MTDS). A database image can include one or more database objects. In other implementations, the databases can be relational database management systems (RDBMSs), object oriented database management systems (OODBMSs), distributed file systems (DFS), no-schema database, or any other data storing systems or computing devices. In some implementations, user computing device 128 can be a personal computer, laptop computer, tablet computer, smartphone, personal digital assistant (PDA), digital image capture devices, and the like.

Application 126 can take one of a number of forms, including user interfaces, dashboard interfaces, engagement consoles, and other interfaces, such as mobile interfaces, tablet interfaces, summary interfaces, or wearable interfaces. In some implementations, it can be hosted on a web-based or cloud-based privacy management application running on a computing device such as a personal computer, laptop computer, mobile device, and/or any other hand-held computing device. It can also be hosted on a non-social local application running in an on-premise environment. In one implementation, application 126 can be accessed from a browser running on a computing device. The browser can be Chrome, Internet Explorer, Firefox, Safari, and the like. In other implementations, application 126 can run as an engagement console on a computer desktop application.

Page elements database 102 includes the different preprogrammed page elements of a support component add-in. Examples of page elements database 102 include featured categories, search boxes, case submitters, etc., which are described in greater detailed latter in this application. In one implementation, page elements are stored as computer readable code written in any programming language. Some examples of languages that can be used include C, AJAX, Python, C++, or JAVA. The software programs can be further translated into machine language or virtual machine instructions and stored in a program file in that form. The program file can then be stored on or in one or more of the articles of manufacture, according to other implementations.

In one implementation, customization environment 100 can comprise of a search appliance that accesses search indices on database server. Search indices can provide keyword indices for a support articles database, which includes a collection of support articles later described in this application. According to one implementation, search appliance performs key word searching in search indices to identify articles in support articles database that contain words in search query provided by a featured search page element.

Custom instructions database 108 holds commands provided by the customers. It further updates the corresponding page elements to which the commands relate. For instance, if the customer updates the background color of a particular search box page element, the custom instructions database 108 stores the updated value of the background color attribute of the particular search box page element.

Add-in generation engine 122 produces a support component add-in that can be embedded, integrated, or linked to or as CRM websites. In one implementation, the Add-in generation engine 122 combines the code base for a support component add-in and a code repository of a CRM website based on customer preferences. In another implementation, the add-in generation engine 122 assigns a plurality of placeholders in the code repository of a CRM website and upon receiving code base for a support component add-in, evaluates the code base and automatically inserts suitable portions of the code base in the CRM website's code repository. In some implementations, the evaluation is based on the attributes of the specific placeholders of the CRM website that are to be populated, such as length, width, or content type of the placeholders.

Visually Rich Customization Protocol

FIG. 2 shows a visually rich customization protocol 200 of the support add-in component that presents visitors of the CRM website with support articles organized by data categories. In other implementations, the support articles can be classified, stratified, or categorized into folders, tags, topics, or any other visual arrangement based on various criteria such as industry type, products, services, job functions, etc. Visitors can also browse and search the support articles based on the data categories. The self-service customization protocol 200 also provides the ability to access cases and browse categories within the navigation page element. In one implementation, the self-service customization protocol 200 includes a featured search page element 215 and featured data categories page element 222. The page elements 215 and 222 require no setup or initialization by the customers and the user is only prompted to specify the number of articles in the featured data categories page element 222 and auto-query suggestions desired in the search queries applied to the featured search page element 215.

As shown in FIG. 2, the customization protocol 200 can be used by the customers to upload the images they will use to represent various data categories on their CRM website and to extend their company's branding, according to one implementation. In the example shown in FIG. 2, if the CRM website has an "all recipes" data category group with categories for "thanksgiving," "seafood," "salads," and so on. To add visual interest, the customization protocol 200 can be used to display images that represent each of the categories in the featured categories page element 222. In some implementations, each category can have at least one image associated with it, which appears in a square frame on the category page or a rectangular frame in the search bar 215. In one implementation, the customers can use the convention <datacategoryname>-<size>.<filetype> to name the image files, so that the correct image file is associated with the data category of the same name. Further, the customers can enter a relative unified resource locator (URL) and use the expression {!Global.PathPrefix}/{!DataCategory.Name}.jpg in an element's "category image URL" field. This expression maps directly to <datacategoryname>-<size> and displays images for the data categories in the order in which they are listed in the data category group.

In another implementation, a "category group name" field of the customization protocol 200 allows customers to provide a unique name of the data category group that contains the data categories for the CRM website. This field reflects the hierarchy of categories that the customers have setup and is used throughout the CRM website to organize support articles. In another implementation, a "top level category" field of the customization protocol 200 allows customers to specify the highest-level category they want to display. In some implementations, the children of this category appear in the CRM website. In other implementations, the customers can set up several nested layers of categories above this category and the CRM website shows this as the parent and its sub-categories as children.

Another implementation includes the featured search page element 215 having a "home view" and "other view." The home view uses the expression {!Site.TopLevelCategory} to search based on the top-level category. The other view uses the expression {!category} to search within the current category. For example, if a customer's company sells internationally, the customer can have a group for "products" and under it categories for Americas, Europe, Asia, and so on. Under each region, the customer can list sub-categories for the products sold in that market. If the customer use Asia as the top-level category, then only product categories listed under Asia appear in the CRM website. In some other implementation, a "company name" field of the add-in component allows customers to designate a name of their company as they want it to appear in the header of the single-page CRM website.

In another implementation, the customers can also configure visitor profiles to specify permissions and define access to the CRM website. Additionally, the customization protocol 200 can be used to create a case assignment rule so that support requests from the CRM website are assigned to support agents.

FIG. 3A shows one implementation of a schema 300A of featured categories page element. This and other data structure descriptions that are expressed in terms of objects can also be implemented as tables that store multiple records or object types. Reference to objects is for convenience of explanation and not as a limitation on the data structure implementation. FIG. 3A shows featured categories object 302 linked to category object 305. Category object 305 is further linked to sub-category object 308. In other implementations, feature category schema 300A may not have the same objects, tables, fields or entries as those listed above and/or may have other/different objects, tables, fields or entries instead of, or in addition to, those listed above such as a user object, view object, or organization object.

Featured categories object 302 identifies the top-level featured category page element of a particular view of a support component add-in. In the example shown in FIG. 3A, a "PageElementID*" field uniquely identifies a feature category page element, such as "ALL" 222 shown in FIG. 2. Also, an "AddInID" field specifies the support component add-in that is hosting the feature category page element identified by the "PageElementID*" field. Further, a "ViewID" field refers to the view that is loaded to present the feature category page element to the visitors of the CRM website that uses the support component add-in identified by the "AddInID" field.

Category object 305 reflects at least one of the many sub-categories in the featured page element page element specified by the "PageElementID*" field. It can also include fields to store the images associated with the category along with a URL that can be used to access the category. It can further identify the different sub-categories that come under the category. Such sub-categories can be stored in the sub-category object 308, which identifies the particular sub-category using the field "SubCategoryID*" and can also include an image and URL field.

In yet another implementation, schema 300A can have one or more of the following variables with certain attributes: USER_ID being CHAR (15 BYTE), IMAGES_ID being CHAR (15 BYTE), VIEW_ID being CHAR (15 BYTE), COMPONENT_ID being CHAR (15 BYTE), WEBSITE_ID being CHAR (15 BYTE), LINK_ID being CHAR (15 BYTE), CREATED_BY being CHAR (15 BYTE), CREATED_DATE being DATE, and DELETED being CHAR (1 BYTE).

Support Article

FIG. 3B illustrates one implementation of a collection 300B of support articles, which can be in the form of text, audio, video, or audio and video. Support article (SA) 312 is a data container or data structure, to provide metadata storage for one or more support article versions (SAV) 322. SAV 312 is a document that has a distinct version among all other SAVs within SA 312. SA 312 can be stored separate from its children SAVs 322. However, SA 312 can include pointers to its children SAVs 322 that can be stored separate from SA 312.

In one implementation, support articles (SA) are categorized by data categories. Data categories can be defined in data category groups, each group being a hierarchy of data categories. In some implementations, access to the SAs can be controlled based on roles of the users. For instance, certain data categories of SAs can be restricted to support agents for viewing and editing, whereas some data categories of SAs can be made available public to all users. A SA is assigned a data category to best reflect the content of the SA. A typical data category group can include one or more of the name of a product, level of access, and a topic. The level of access includes whether a SA in a data category group is restricted to some type of customers. The topic attribute can include information about the primary objectives of the SA. For example whether the SA is about how to use the product, how to buy the product, how to cancel subscription of a product, etc.

A SA can be categorized under more than one data category group. For example, if the subject matter of the SA span across multiple products, the SA can be categorized under several data category groups, each including a different product. Appropriate search filters can be provided to enable efficient searches by data category groups. For example, a search can be performed for all SAs within a selected data category group, or all SAs within a selected data category group and a selected topic, etc.

A SA type refers to a specific format for the SA. In one implementation, various templates can be provided to enable customers to create new SAs. For example, if a user wishes to create a SA of type "frequently asked questions" (FAQ), a pre-built template can be used. The pre-built template can include fields such as a "Question" field and an "Answer" field. Similarly, a template for creating a new SA regarding product descriptions can include fields such as Picture, Short Description, Long Description, User Manual, etc. These templates can be customized to conform to specific customer requirements. In one implementation, customers with appropriate authorization can create new SA type templates.

Text-Based Customization Protocol

FIG. 4 depicts one implementation of a text-based customization protocol 400 suitable for mobile devices with small screen sizes. In the example shown in FIG. 4, the featured categories page elements are not visually represented by images as in the visually rich customization protocol 300A of FIG. 3A. In some implementations, when a visitor accesses the CRM website from a mobile device, the text-based customization protocol 400 is automatically used for the all or a combination of the page elements, featured search page element 215 and case submitter 800. In addition, such a text-based customization protocol 400 can overcome bandwidth limitations of networks 115 by preventing network congestion that is sometimes caused by information packets carrying data related to multi-media, including images, videos, and the like.

FIG. 4 also illustrates a trending articles page element 432, which presents to the visitor articles that both match the query criteria entered by the visitor in the featured search page element 215 and are most popular on different social networking platforms such as Facebook®, Twitter®, and LinkedIn®. In one implementation, the popularity of an article is determined by the number of re-tweets, likes, shares, visits, or posts. In yet another implementation, the trending articles are selected based on the current data category a visitor is viewing on the CRM website and the number of times a particular article has been recently viewed within a pre-determined window of time. For example, if a visitor is the "Thanksgiving" data category and a specific article about "how to make a turkey?" (qualifying as to fall within the "Thanksgiving" data category) has been viewed n number of times in the last x minutes such that n and x exceed pre-designated thresholds for viewership and recency, the specific article is presented to the visitor as a trending article.

FIG. 5 shows one implementation of a schema 500 of tending articles page element. This and other data structure descriptions that are expressed in terms of objects can also be implemented as tables that store multiple records or object types. Reference to objects is for convenience of explanation and not as a limitation on the data structure implementation. FIG. 5 shows trending articles object 502 linked to category object 305. Category object 505 is further linked to article object 508. In other implementations, trending articles schema 500 may not have the same objects, tables, fields or entries as those listed above and/or may have other/different objects, tables, fields or entries instead of, or in addition to, those listed above such as a user object, API interface object, or social networking platform object.

Trending articles object 502 identifies the top-level featured category page element of a particular view of a support component add-in. In the example shown in FIG. 5, a "PageElementID*" field uniquely identifies a feature category page element, such as "TRENDING" 432 shown in FIG. 4. Also, an "AddInID" field specifies the support component add-in that is hosting the feature category page element specified by the "PageElementID*" field. Further, a "ViewID" field refers to the view that is loaded to present the feature category page element to the visitors of the CRM website that uses the support component add-in identified by the "AddInID" field.

Category object 505 reflects at least one of the many sub-categories in the featured page element page element specified by the "PageElementID*" field. It can also include fields to specify the different trending articles associated with the category. Such tending articles can be stored in the article object 508, which identifies the particular trending article using the field "ArticleID*" and specifies the social networking platform on which the article identified by the field "ArticleID*" is trending, along with a URL that can be used to access the article.

In yet another implementation, schema 500 can have one or more of the following variables with certain attributes: USER_ID being CHAR (15 BYTE), PLATFORM_ID being CHAR (15 BYTE), VIEW_ID being CHAR (15 BYTE), COMPONENT_ID being CHAR (15 BYTE), WEBSITE_ID being CHAR (15 BYTE), LINK_ID being CHAR (15 BYTE), CREATED_BY being CHAR (15 BYTE), CREATED_DATE being DATE, and DELETED being CHAR (1 BYTE).

Branding Editor

FIG. 6 depicts one implementation of a branding editor 600 that customizes page elements of a support component add-in in response to customer instructions. According to one implementation, a branding editor 600 of the CRM website provides a flexible way for the customers to define different aspects of their self-service CRM website's brand. By customizing their CRM website's branding properties, the customers can easily define and change different aspects of their CRM website's appearance. In some implementations, the customers can reference branding properties in style sheets to let their support team quickly update the CRM website's appearance using the branding editor. Some examples of the branding properties include link font color, button background and font color, font family, font size, and font color, header background color, font family, font size, and font color, and component background color. In another implementation, the branding editor includes two areas, one called an "editor palette"602 that contains all of the branding properties that customers can edit and another called the "preview area," which shows a live preview of how the CRM website will appear after a particular branding property or style is updated.

Case Submitter

Figure 8:
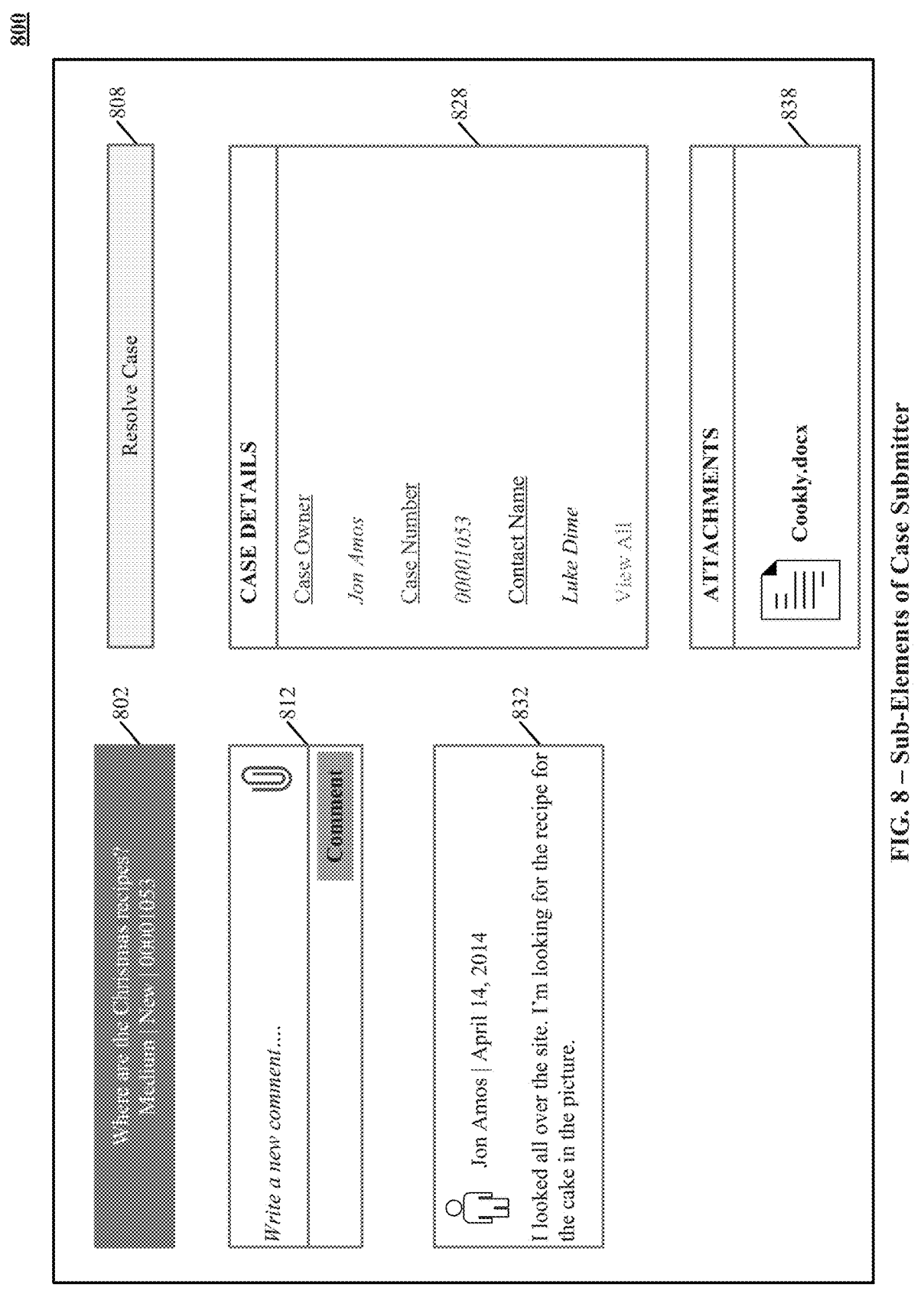

FIGS. 7 and 8 show one implementation of a case submitter page element 800. Customization protocol 200 can include a support page element 732 that allows visitors of the CRM website to submit support requests in order to obtain assistance from customer service or support agents using button 742. When a visitor selects the "contact support" button 742, a case submitter page element 800 is loaded to as the current view of the CRM website to receive visitor feedback regarding the support request. Case submitter page element 800 includes a plurality of sub-elements such as case highlights 802, case status pane 808, case publisher 812, case details 828, case comments 832, and case attachments 838. Case highlights strip 802 provide a single-line summary for the visitor, which includes three distinct features. In this example, the case highlights tell the visitor that the inquiry requires a "medium" level of expertise, the case itself is a new case, and the case number is 00001053. The case status pane 808 in this example reads "resolve case," which allows the visitor to communicate to a service agent that an issue, previously raised by the visitor, no longer needs the service agent's agent or assistance. Case publisher 812 enables the visitor to specify label text for the title and the submit button. The customer can also optionally change the placeholder text for the publisher pane 812 and choose not to allow the visitors to attach any files, according to some implementations. Case details window 828 provide the visitor with the name of the case owner "Jon Amos", the case number "00001053," and the contact name "Luke Dime." Case comments 832 allow the visitors to enter text which can include a description of the problem or issue sought to be resolved. Case attachments tool 838 enables the visitor to upload an attachment of the problem. The attachment can include a number of file formats such as "img," "jpeg," "bit," "pdf," "docx," "xls," etc., depending on the nature of the file uploaded. For example, in some cases the visitor may wish to include a picture or video of their problem or issue along with location information from the device being used to make the support request that identifies the location of the problem or issue. In other cases, the visitor may wish to provide the agent with supporting documents or written descriptions of the issues they are facing. In yet other aspects, sensor and/or biometric data such as heart rate values, blood pressure values, UV dose obtained, temperature, or humidity collected using a wearable computing device (Google Glass®, Fitbit Tracker®, Leap Motion Controller®) or other sensor can be uploaded.

FIG. 9 shows one implementation of a schema 900 of a case submitter page element. This and other data structure descriptions that are expressed in terms of objects can also be implemented as tables that store multiple records or object types. Reference to objects is for convenience of explanation and not as a limitation on the data structure implementation. FIG. 9 shows support request object 902 linked to status object 905. In other implementations, case submitter schema 900 may not have the same objects, tables, fields or entries as those listed above and/or may have other/different objects, tables, fields or entries instead of, or in addition to, those listed above such as a highlights object, comment object, or details object.

Support request object 902 identifies a support request made by a visitor of a CRM website. In the example shown in FIG. 9, a "SubmitterID*" field uniquely identifies a case submitter page element used to generate the support request, such as case submitter 800 shown in FIG. 8. Also, an "AddInID" field specifies the support component add-in that is hosting the case submitter page element identified by the "SubmitterID*" field. Further, a "ViewID" field refers to the view that is loaded to present the case submitter page element to the visitors of the CRM website that uses the support component add-in identified by the "AddInID" field.

Status object 905 reflects a status of the support request. In other implementations, other sub-elements of a case submitter page element such as case highlights, case comments, case owner, case contact, case attachments, or case title can be linked to the support request object 902 as objects of schema 900.

In yet another implementation, schema 900 can have one or more of the following variables with certain attributes: USER_ID being CHAR (15 BYTE), HIGHLIGHTS_ID being CHAR (15 BYTE), VIEW_ID being CHAR (15 BYTE), COMPONENT_ID being CHAR (15 BYTE), WEBSITE_ID being CHAR (15 BYTE), TITLE_ID being CHAR (15 BYTE), CREATED_BY being CHAR (15 BYTE), CREATED_DATE being DATE, and DELETED being CHAR (1 BYTE).

Search View

FIG. 10 illustrates one implementation of a search view 1000 of the support add-in component. Search view 1000 includes the search box 215, featured data categories page element 222, results pane 1035, category filter 1028, and article type filter 1048, according to one implementation. In FIG. 10, the results pane 1035 displays the results returned in response to a search criteria entered by a visitor of the CRM website in the search box 215. Category filter 1028 allows the visitor to filter the search results according to a particular category. In the example shown in FIG. 10, holidays are used to filter the search results. The visitor has chosen "Thanksgiving" as the filter and therefore only the results associated with "Thanksgiving," such as "how to roast a perfect turkey for Thanksgiving," are returned to the visitor. Article type filter 1048 enables the visitors to choose the type of articles they would like to receive in response to the search criteria entered in the search box 215. For instance, the visitors can select to view only "how to" articles as opposed to all the articles retrieved based on the entered search criteria.

In other implementations, the search box 215 also generates, in real-time or near real-time, auto-query suggestions 1022 desired in the search box 215 based on a query primitive entered by a visitor of the CRM website. When the visitor types in the search box 215, certain articles and search strings are returned based on matches with the characters being typed in the search box 215 before the visitor clicks the search button 1002. This kind of incremental search, referred to as "type-ahead," gives the visitor immediate results and helps the visitor find the most relevant articles or popular search terms as they type the search string. The user can use the Tab or Arrow keys to display the first suggestion or select on any of the returned results to view that article, according to one implementation. In the example shown in FIG. 10, upon entering a query primitive, i.e. a portion of the query, related to "thanksgiving," the visitor is presented with article suggestions related to thanksgiving.

Flowchart of Simplified Development of a Support Component Add-In

FIG. 11 is a representative method 1100 of simplified development of a CRM-integrated website support component add-in. Flowchart 1000 can be implemented at least partially with a database system, e.g., by one or more processors configured to receive or retrieve information, process the information, store results, and transmit the results. Other implementations may perform the actions in different orders and/or with different, varying, alternative, modified, fewer or additional actions than those illustrated in FIG. 11. Multiple actions can be combined in some implementations. For convenience, this flowchart is described with reference to the system that carries out a method. The system is not necessarily part of the method.

At action 1102, a customization protocol for a single-page application is exposed to web developers or customers who wish to build a CRM website. In one implementation, the customization protocol implements a support component add-in to a CRM website that includes at least one page element preprogrammed to at least search support articles hosted by the CRM web site, display visual representations of featured categories of articles available within the CRM website, and contact support for the CRM website.

At action 1112, customization instructions applicable to the page element of the support component add-in are received from the customer. In one implementation, the customization instructions are in the form drag and drop actions performed by the customer that add the page element to the customized support component add-in. In some implementations, the customization instructions are in the form of traditional touch inputs, vocal commands, gestural commands, or optical commands.

In one implementation, when the page element is a branding editor, the customization instructions applicable to the branding editor specify branding properties of the CRM website. In some implementations, the branding properties of the CRM website include at least one of font color of links within the CRM website, background and font color of buttons within the CRM website, font family, font size, and font color of text within the CRM website, background, font family, font size, and font color of headers within the CRM website, background, font family, font size, and font color of footers within the CRM website, and background color of the page elements.

In another implementation, when the page element is a search box, the customization instructions applicable to the search box specify at least one of a number of support articles within in the CRM website, placeholder text for the search box, and auto-query suggestions to return.

In yet another implementation, when the page element is a featured category, the customization instructions applicable to the featured category specify at least one of one or more data categories for grouping the support articles within the CRM website, a library of images and linking of the images to the data categories, and titles for the data categories.

In a further implementation, when the page element is a case submitter, the customization instructions applicable to the case submitter specify fields for generating a support request. In some implementations, the fields of the case submitter include at least one of highlights of the support request, status of the support request, details of the support request, attachments related to the support request, owner of the support request, contact for the support request, comments on the support request, and title of the support request.

At action 1122, in response to receiving the customization instructions, updated data is generated to display a live preview of implementing the customized support component add-in to the CRM website. In one implementation, the branding editor 600 includes a preview area that shows a live preview of how the CRM website will appear after a particular branding property or style is updated by the customer.

At action 1132, a customized support component add-in code base is generated for display, which is suitable to be embedded on or linked to the CRM web site. In one implementation, the customer can select, using a graphical user interface (GUI) or a special selection tool, which add-in code base to include in the CRM website.

At action 1142, the page element automatically calibrates to different screen sizes by selecting between a visually-rich representation, such as customization protocol 200, and a text-based representation like customization protocol 400, responsive to a screen size of a current device used to access the CRM website. For instance, if the CRM website is being accessed by a desktop, then the visually rich customization protocol 200 is used to present the different views of the CRM website to the visitors. In contrast, if the CRM website is accessed from a mobile device with smaller screen size, the text-based customization profile 400 is used to generate the various views of the CRM website. Because the text-based customization profile 400 does not contain images and thus requires a smaller content and graphics canvas, more suitable for smaller screen sizes.

This method and other implementations of the technology disclosed can include one or more of the following features and/or features described in connection with additional methods disclosed. In the interest of conciseness, the combinations of features disclosed in this application are not individually enumerated and are not repeated with each base set of features. The reader will understand how features identified in this section can readily be combined with sets of base features identified as implementations in sections of this application such as customization environment, visually rich customization protocol, text-based customization protocol, branding editor, case submitter, search view, etc.

Other implementations can include a non-transitory computer readable storage medium storing instructions executable by a processor to perform any of the methods described above. Yet another implementation can include a system including memory and one or more processors operable to execute instructions, stored in the memory, to perform any of the methods described above.

Computer System

FIG. 12 is a block diagram of an example computer system 1200 used for simplified development of a CRM-integrated website support component add-in. Computer system 1210 typically includes at least one processor 1214 that communicates with a number of peripheral devices via bus subsystem 1212. These peripheral devices can include a storage subsystem 1224 including, for example, memory devices and a file storage subsystem, user interface input devices 1222, user interface output devices 1218, and a network interface subsystem 1216. The input and output devices allow user interaction with computer system 1210. Network interface subsystem 1216 provides an interface to outside networks, including an interface to corresponding interface devices in other computer systems.

User interface input devices 1222 can include a keyboard; pointing devices such as a mouse, trackball, touchpad, or graphics tablet; a scanner; a touch screen incorporated into the display; audio input devices such as voice recognition systems and microphones; and other types of input devices. In general, use of the term "input device" is intended to include all possible types of devices and ways to input information into computer system 1210.

User interface output devices 1218 can include a display subsystem, a printer, a fax machine, or non-visual displays such as audio output devices. The display subsystem can include a cathode ray tube (CRT), a flat-panel device such as a liquid crystal display (LCD), a projection device, or some other mechanism for creating a visible image. The display subsystem can also provide a non-visual display such as audio output devices. In general, use of the term "output device" is intended to include all possible types of devices and ways to output information from computer system 1210 to the user or to another machine or computer system.

Storage subsystem 1224 stores programming and data constructs that provide the functionality of some or all of the modules and methods described herein. These software modules are generally executed by processor 1214 alone or in combination with other processors.

Memory 1226 used in the storage subsystem can include a number of memories including a main random access memory (RAM) 1230 for storage of instructions and data during program execution and a read only memory (ROM) 1232 in which fixed instructions are stored. A file storage subsystem 1228 can provide persistent storage for program and data files, and can include a hard disk drive, a floppy disk drive along with associated removable media, a CD-ROM drive, an optical drive, or removable media cartridges. The modules implementing the functionality of certain implementations can be stored by file storage subsystem 1228 in the storage subsystem 1224, or in other machines accessible by the processor.

Bus subsystem 1212 provides a mechanism for letting the various components and subsystems of computer system 1210 communicate with each other as intended. Although bus subsystem 1212 is shown schematically as a single bus, alternative implementations of the bus subsystem can use multiple busses. Application server 1220 can be a framework that allows the applications of computer system 1200 to run, such as the hardware and/or software, e.g., the operating system.

Computer system 1210 can be of varying types including a workstation, server, computing cluster, blade server, server farm, or any other data processing system or computing device. Due to the ever-changing nature of computers and networks, the description of computer system 1210 depicted in FIG. 12 is intended only as one example. Many other configurations of computer system 1210 are possible having more or fewer components than the computer system depicted in FIG. 12.

The terms and expressions employed herein are used as terms and expressions of description and not of limitation, and there is no intention, in the use of such terms and expressions, of excluding any equivalents of the features shown and described or portions thereof. In addition, having described certain implementations of the technology disclosed, it will be apparent to those of ordinary skill in the art that other implementations incorporating the concepts disclosed herein can be used without departing from the spirit and scope of the technology disclosed. Accordingly, the described implementations are to be considered in all respects as only illustrative and not restrictive.

Particular Implementations

In one implementation, we disclose a method of simplified development of a CRM-integrated website support component. The method includes exposing a customization protocol for a single page website that implements a support component add-in to a customer relationship management (CRM) website, the support component add-in including at least one page element preprogrammed to: search support articles hosted by the CRM web site, display visual representations of featured categories of articles available within the CRM website, and contact support for the CRM web site. The method also includes receiving customization instructions applicable to the page element of the support component add-in, and generating for display a customized support component add-in code base suitable to be embedded on or linked to the CRM web site.

This method and other implementations of the technology disclosed can include one or more of the following features and/or features described in connection with additional methods disclosed. In the interest of conciseness, the combinations of features disclosed in this application are not individually enumerated and are not repeated with each base set of features. The reader will understand how features identified in this section can readily be combined with sets of base features identified as implementations.

Practicing the method, the page element can include a branding editor and the customization instructions applicable to the branding editor can specify branding properties of the CRM website. These branding properties of the CRM website include at least one of: font color of links within the CRM website, background and font color of buttons within the CRM website, font family, font size, and font color of text within the CRM website, background, font family, font size, and font color of headers within the CRM website, background, font family, font size, and font color of footers within the CRM website, and background color of the page elements.

The page element can include a search box and the customization instructions applicable to the search box specify at least one of: a number of support articles within in the CRM website, placeholder text for the search box, and auto-query suggestions to return.

The page element can be a featured category and the customization instructions applicable to the featured category specify at least one of: one or more data categories for grouping the support articles within the CRM website, a library of images and linking of the images to the data categories, and titles for the data categories.

The page element can be a case submitter and the customization instructions applicable to the case submitter specify fields for generating a support request. The fields of the case submitter can include at least one of: highlights of the support request, status of the support request, details of the support request, attachments related to the support request, owner of the support request, contact for the support request, comments on the support request, and title of the support request.

The method can further include, responsive to receiving the customization instructions, generating updated data for displaying a live preview of implementing the customized support component add-in to the CRM website.

The method can further include adding the page element to the customized support component add-in by a drag and drop action.

The page element can automatically calibrate to different screen sizes by selecting between a visually-rich representation and a text-based representation responsive to a screen size of a current device used to access the CRM website.

Other implementations may include a non-transitory computer readable storage medium storing instructions executable by a processor to perform any of the methods described above. Yet another implementation may include a system including memory and one or more processors operable to execute instructions, stored in the memory, to perform any of the methods described above.

While the present technology is disclosed by reference to the preferred implementations and examples detailed above, it is to be understood that these examples are intended in an illustrative rather than in a limiting sense. It is contemplated that modifications and combinations will readily occur to those skilled in the art, which modifications and combinations will be within the spirit of the technology and the scope of the following claims.

The invention claimed is:

1. A method of delivering personalized content for a visitor of a customer relationship management (CRM) website, the method comprising:
receiving, by at least one processor, from a website developer, personalization instructions configured to allow a website developer to create a customized web-page zone to be integrated in the CRM website for the visitor;
generating, by the at least one processor, data for display, to the website developer, of a live preview of the CRM website including the customized web-page zone to be integrated in the CRM website, using the received personalization instructions;
selecting, by the at least one processor, a data tag and at least one page to be published as the personalized content based at least in part on interactions with the visitor, including determining, by the at least one processor, a current data tag of displayed content that the visitor views on the CRM website and whether the at least one page has been viewed at a specific time frame, for a number of times exceeding a predetermined threshold within the specific time frame, and whether the at least one page is related to the current data tag; and
publishing, by the at least one processor, to the visitor, in response to the visitor visiting the CRM website, the personalized content in the CRM website based at least in part on the selecting, of the data tag selected and the at least one page, and based at least in part on the determining of the current data tag and whether the at least one page has been viewed at the specific time frame for the number of times exceeding the predetermined threshold.

2. The method of claim 1, wherein the customized web-page zone is configured to allow the visitor to interact with the CRM website to view the displayed content and to retrieve, for the determining, the current data tag of the displayed content that the visitor views.

3. The method of claim 2, wherein the personalized content comprises a context of a previous interaction of the visitor with the CRM website.

4. The method of claim 1, wherein the personalization instructions are configured to allow the website developer to edit the customized web-page zone without coding.

5. The method of claim 1, further comprising displaying, by the at least one processor, to the website developer, based at least in part on the personalization instructions, a preview of the personalized content for the visitor.

6. The method of claim 1, wherein the interactions with the visitor comprise at least one search query related to at least one of the current data tag, the data tag selected, the at least one page, or a combination thereof.

7. A system for delivering personalized content for a visitor of a customer relationship management (CRM) website, comprising:
a memory; and at least one processor communicatively coupled to the memory, wherein the at least one processor is configured to perform operations comprising:

receiving, from a website developer, personalization instructions configured to allow a website developer to create a customized web-page zone to be integrated in the CRM website for the visitor;

generating data for display, to the website developer, of a live preview of the CRM website including the customized web-page zone to be integrated in the CRM website, using the received personalization instructions;

selecting a data tag and at least one page to be published as the personalized content based at least in part on interactions with the visitor, including determining a current data tag of displayed content that the visitor views on the CRM website and whether the at least one page has been viewed at a specific time frame, for a number of times exceeding a predetermined threshold within the specific time frame, and whether the at least one page is related to the current data tag;

publishing, to the visitor, in response to the visitor visiting the CRM website, the personalized content in the CRM website based at least in part on the selecting, of the data tag selected and the at least one page, and based at least in part on the determining of the current data tag and whether the at least one page has been viewed at the specific time frame for the number of times exceeding the predetermined threshold.

8. The system of claim 7, wherein the customized web-page zone is configured to allow the visitor to interact with the CRM website to view the displayed content and to retrieve, for the determining, the current data tag of the displayed content that the visitor views.

9. The system of claim 8, wherein the personalized content comprises a context of a previous interaction of the visitor with the CRM website.

10. The system of claim 7, wherein the personalization instructions are configured to allow the website developer to edit the customized web-page zone without coding.

11. The system of claim 7, the operations further comprising displaying, by the at least one processor, to the website developer, based at least in part on the personalization instructions, a preview of the personalized content for the visitor.

12. The system of claim 7, wherein the interactions with the visitor comprise at least one search query related to at least one of the current data tag, the data tag selected, the at least one page, or a combination thereof.

13. The system of claim 7, wherein the personalized content comprises at least one of a text element and a graphical element.

14. A non-transitory computer-readable storage medium having instructions stored thereon that, when executed by at least one computing device, cause the at least one computing device to perform operations for delivering personalized content for a visitor of a customer relationship management (CRM) website, the operations comprising:

receiving, from a website developer, personalization instructions configured to allow a website developer to create a customized web-page zone to be integrated in the CRM website for the visitor;

generating data for display, to the website developer, of a live preview of the CRM website including the customized web-page zone to be integrated in the CRM website, using the received personalization instructions;

selecting a data tag and at least one page to be published as the personalized content based at least in part on interactions with the visitor, including determining a current data tag of displayed content that the visitor views on the CRM website and whether the at least one page has been viewed at a specific time frame, for a number of times exceeding a predetermined threshold within the specific time frame, and whether the at least one page is related to the current data tag;

publishing, to the visitor, in response to the visitor visiting the CRM website, the personalized content in the CRM website based at least in part on the selecting, of the data tag selected and the at least one page, and based at least in part on the determining of the current data tag and whether the at least one page has been viewed at the specific time frame for the number of times exceeding the predetermined threshold.

15. The non-transitory computer-readable storage medium of claim 14, wherein the customized web-page zone is configured to allow the visitor to interact with the CRM website to view the displayed content and to retrieve, for the determining, the current data tag of the displayed content that the visitor views.

16. The non-transitory computer-readable storage medium of claim 15, wherein the personalized content comprises a context of a previous interaction of the visitor with the CRM website.

17. The non-transitory computer-readable storage medium of claim 14, wherein the personalization instructions are configured to allow the website developer to edit the customized web-page zone without coding.

18. The non-transitory computer-readable storage medium of claim 14, the operations further comprising displaying, to the website developer, based at least in part on the personalization instructions, a preview of the personalized content for the visitor.

19. The non-transitory computer-readable storage medium of claim 14, wherein the interactions with the visitor comprise at least one search query related to at least one of the current data tag, the data tag selected, the at least one page, or a combination thereof.

20. The non-transitory computer-readable storage medium of claim 14, wherein the personalized content comprises at least one of a text element and a graphical element.

* * * * *